United States Patent
Rubidge et al.

(10) Patent No.: US 7,725,622 B2
(45) Date of Patent: May 25, 2010

(54) DATA DISTRIBUTION SYSTEM AND METHOD

(75) Inventors: Jeffrey Rubidge, Philadelphia, PA (US); Stuart Townsend, Chicago, IL (US)

(73) Assignee: Townsend Analytics, Ltd., Chicago, IL (US)

( * ) Notice: Subject to any disclaimer, the term of this patent is extended or adjusted under 35 U.S.C. 154(b) by 206 days.

(21) Appl. No.: 11/605,937

(22) Filed: Nov. 29, 2006

(65) Prior Publication Data

US 2008/0126575 A1    May 29, 2008

(51) Int. Cl.
G06F 3/00    (2006.01)
G06F 12/00    (2006.01)

(52) U.S. Cl. .............. 710/38; 710/37; 711/216
(58) Field of Classification Search .......... 710/37, 710/38; 711/216
See application file for complete search history.

(56) References Cited

U.S. PATENT DOCUMENTS

| | | | |
|---|---|---|---|
| 5,757,920 A | 5/1998 | Misra et al. | |
| 5,764,768 A | 6/1998 | Spelman et al. | |
| 5,815,665 A | 9/1998 | Teper et al. | |
| 5,864,827 A | 1/1999 | Wilson | |
| 5,872,850 A | 2/1999 | Klein et al. | |
| 5,987,432 A | 11/1999 | Zusman et al. | |
| 5,999,711 A | 12/1999 | Misra et al. | |
| 6,044,155 A | 3/2000 | Thomlinson et al. | |
| 6,278,982 B1 | 8/2001 | Korhammer et al. | |
| 6,349,291 B1 | 2/2002 | Varma | |
| 6,427,209 B1 | 7/2002 | Brezak et al. | |
| 6,449,645 B1 | 9/2002 | Nash | |
| 6,584,505 B1 | 6/2003 | Howard et al. | |
| 6,603,765 B1 * | 8/2003 | Wilford et al. | 370/395.32 |
| 6,654,745 B2 | 11/2003 | Feldman | |
| 6,772,131 B1 | 8/2004 | Francis et al. | |
| 6,789,255 B1 | 9/2004 | Pedrizetti et al. | |
| 7,051,200 B1 | 5/2006 | Manferdelli et al. | |
| 7,277,386 B1 * | 10/2007 | Ferguson et al. | 370/230 |
| 2002/0023040 A1 | 2/2002 | Gilman et al. | |
| 2002/0128958 A1 | 9/2002 | Slone | |
| 2002/0147670 A1 | 10/2002 | Lange | |
| 2002/1056718 | 10/2002 | Olsen et al. | |
| 2002/0169707 A1 | 11/2002 | Koek et al. | |
| 2003/0018688 A1 | 1/2003 | Sternin | |
| 2003/0040955 A1 | 2/2003 | Anaya et al. | |
| 2004/0148247 A1 | 7/2004 | Miller et al. | |
| 2004/0260640 A1 | 12/2004 | Crosthwaite et al. | |
| 2005/0005094 A1 | 1/2005 | Jamieson et al. | |
| 2005/0049955 A1 | 3/2005 | Kohnhorst et al. | |
| 2005/0120121 A1 | 6/2005 | Guo et al. | |
| 2005/0125327 A1 | 6/2005 | Fishbain | |
| 2005/0131797 A1 | 6/2005 | Ananthanarayanan et al. | |
| 2005/0193093 A1 | 9/2005 | Mathew et al. | |

OTHER PUBLICATIONS

Osmar Zaiane, "Dynamic Hashing", 1998, http://www.cs.sfu.ca/CC/354/zaiane/material/notes/Chapter11/node20.html.*
RealTick User Manual, Townsend Analytics, Ltd., 2004, pp. 1-424.
Declaration of Charles S. Kwalwasser.

* cited by examiner

*Primary Examiner*—Alford W Kindred
*Assistant Examiner*—David E Martinez
(74) *Attorney, Agent, or Firm*—Morgan Lewis & Bockius, LLP

(57) ABSTRACT

The transmission of data is distributed evenly and predictably over a given number of communication channels using a hash function.

3 Claims, 2 Drawing Sheets

DATA DISTRIBUTION SYSTEM AND METHOD

COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to the distribution of data over communication channels.

BACKGROUND OF THE INVENTION

Most businesses are run using computer systems that include multiple system components and data that is transmitted among such components over a number of communication channels. In some industries, such as the financial services industry in general, and with respect to electronic security trading platforms in particular, the volume of data that is transmitted is significant. In addition, certain securities may trade and quote in enormously high volumes during certain time periods, causing the channels that carry them to consume a disproportionately large amount of CPU resources. This leads to one thread running much hotter than the others and causes performance bottlenecks. Similar problems are experienced in other industries.

SUMMARY OF THE INVENTION

The present invention is directed to a method and system for transmitting data among two or more components of a computer system. The method may be performed by software running on one or more of the components of the system. A count of potential communication channels over which data may be transmitted is identified. An identifier associated with the data is specified. The identifier is comprised of a plurality of characters and indicates a data type. A hash function is applied to the plurality of characters to calculate a hash number. Applying the hash function results in a same hash number each time the hash function is applied to the same set of characters (i.e., a single hash number exists for a given identifier). Using the hash number and the count of potential communication channels, a specific channel over which data of the data type will be transmitted is identified.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and, together with the description, serve to explain the principles of the invention.

In the drawings.

DETAILED DESCRIPTION OF THE PREFERRED EMBODIMENTS

Figure 1:
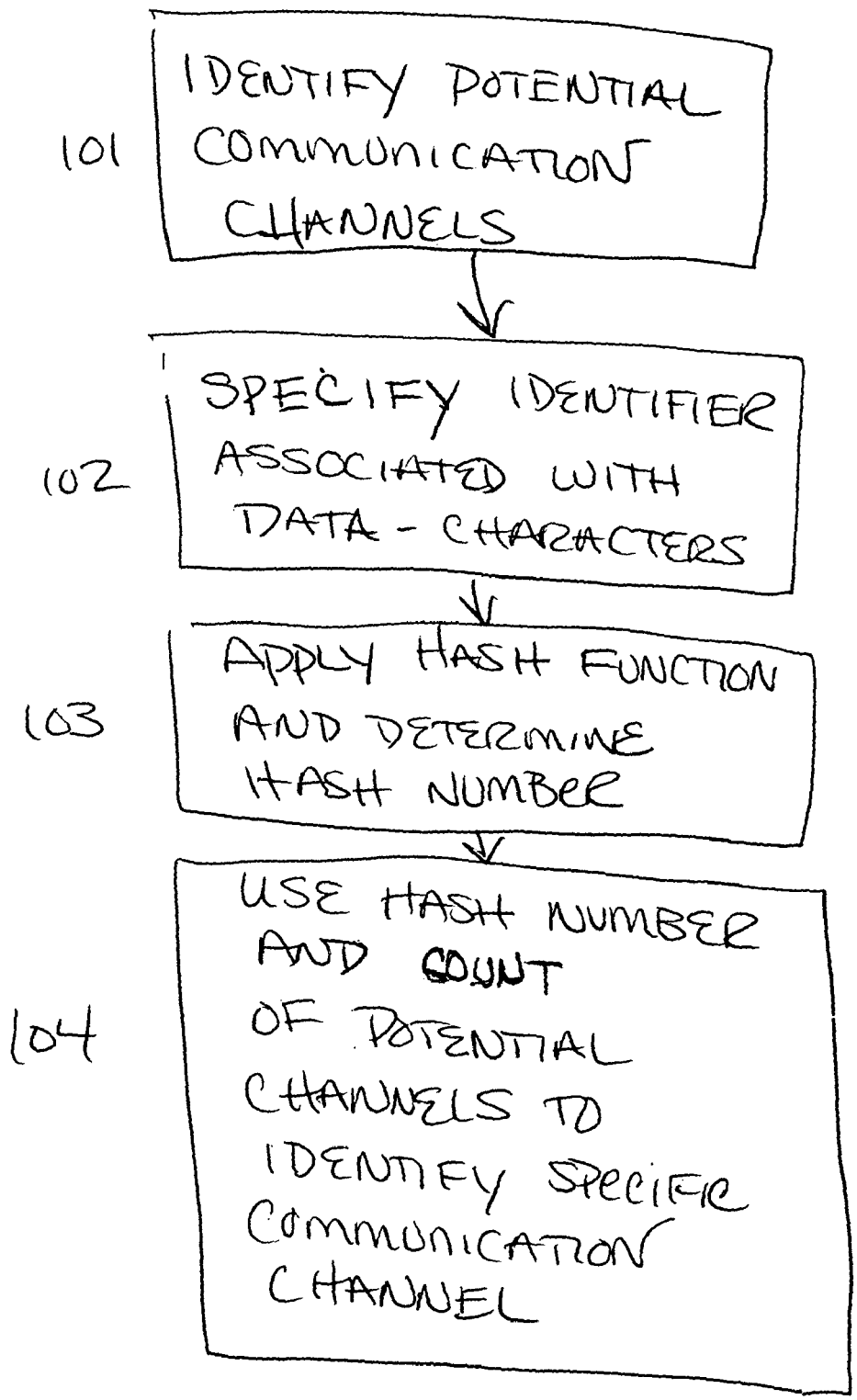
FIG. 1 is a flow chart illustrating a method of the present invention.

The present invention works to distribute the transmission of certain data evenly and predictably over a given number of communication channels, thereby leveling resource usage and gaining more efficient use of hardware. This is accomplished using a Symbol Randomization utility. The utility uses a predictable hash function to consistently place a data of a certain type on the same channel(s) each time. For example, in the context of an electronic securities trading platform, data relating to trades or quotes of a particular stock or option may trade more heavily during certain time periods. The Symbol Randomization utility works to transmit data relating to quotes or trades of a particular stock or option on the same channel(s) each time.

In particular, the hash function turns the symbol name (i.e., associated with a stock or option) into a number. It produces a result with the same number for the same symbol every time it is implemented. For example, as illustrated below, the symbol AAAA will result in the number 250,640 every time the hash function is run. Then, the following formula is used to determine which channel a hash will be assigned to:

HashNum modulo NumChannels+1

Thus, for example, "AAAA" hashes to 250,640 and, if a four channel distribution is chosen, (250,640% 4)+1=1. Thus, trade and quote data for "AAAA" will be transmitted over channel 1 in a four-channel system. If a five-channel system were chosen, (250,640% 5)+1=1, and trade and quote data for "AAAA" will also be transmitted over channel 1 in the five-channel system.

With regard to the details for the how the hashing is accomplished, an array of twenty-two (22) prime numbers is used, as follows:

83, 701, 991, 2081, [ . . . ]

In this example, an array of 22 prime numbers is used because 22 coincides with the maximum number of characters associated with a symbol in this example; however, a larger or smaller array can be used, depending on the maximum number of possible characters in the application at issue. Taking the symbol name one character at a time, the ASCII value of the character is multiplied by the value at the current index in the array. The array index is incremented once for each character processed, wrapping at twenty-two. All the individual character products are summed to arrive at the hash number. Thus, in the AAAA example:

| Char | ASCII | pos(index) | num |
|------|-------|------------|-----|
| A | 65 | 0 | 65 * 83 = 5,395 |
| A | 65 | 1 | 65 * 701 = 45,565 |
| A | 65 | 2 | 65 * 991 = 64,415 |
| A | 65 | 3 | 65 * 2081 = 135,265 |
| HashFunction Number | | | 250,640 |

An example of the SymHash command line application used to determine which channel a symbol (i.e., associated with the stock or option) will be on is set forth in Appendix A, written using MS VC++7.1. This function is exemplary and any function that returns an even distribution of hash values can be used within the scope of the present invention. A hash function is any function that assigns numeric values to items that are to be processed. A good hash function assigns numeric values uniformly over a range. For this example, a hash function was chosen that behaves well in this context (i.e., symbols that are 1 to 22 characters in length, where leading and trailing spaces are immaterial, but internal spaces are significant).

The invention may be implemented through use of an interface in which the user inputs the symbol name and a number of channels and a response will be provided indicating the channel on which the symbol will appear.

A flow chart illustrating a method for transmitting data among two or more components of a computer system is illustrated with reference to FIG. 1. In step 101, a count of potential communication channels over which data may be transmitted is identified. In step 102, an identifier associated with the data is specified. The identifier is comprised of a plurality of characters and indicates a data type (e.g., identifier AAAA is a symbol for the stock of Company A). A hash function is applied to the plurality of characters to calculate a hash number, in step 103. As described above, applying the hash function results in a same hash number each time the hash function is applied to the same set of characters. In step 104, using the hash number and the count of potential communication channels (i.e., in the formula described above), a specific channel over which data of the data type (i.e., quotes and trades of the stock of Company A) will be transmitted is identified.

Figure 2:
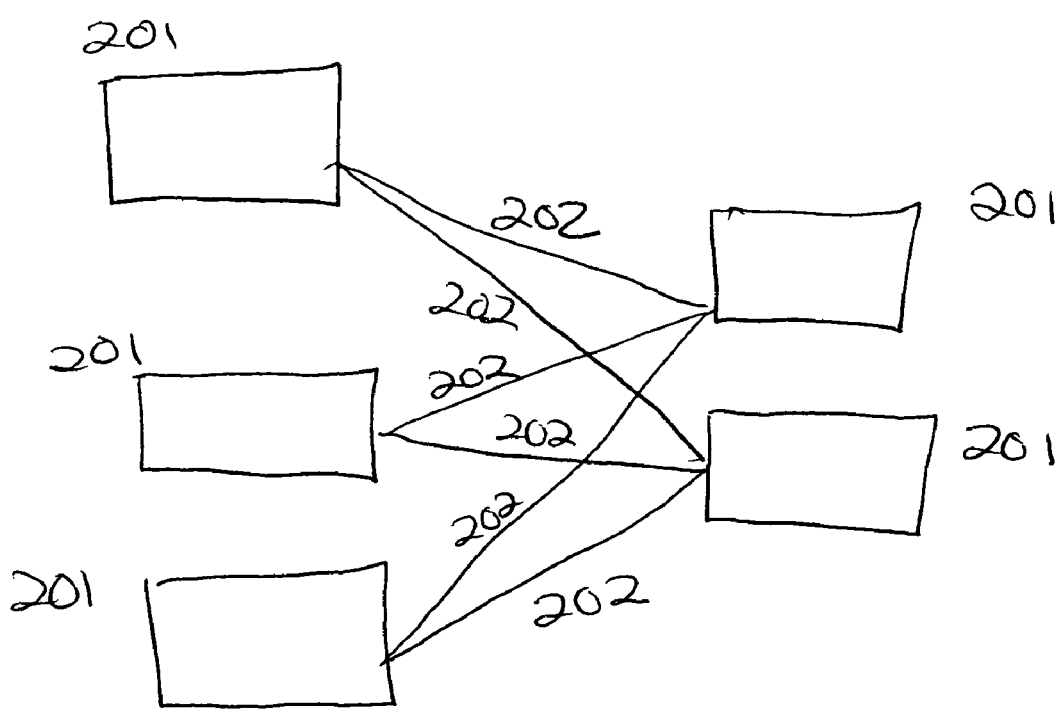
FIG. 2 illustrates a system for carrying out the present invention.

With reference to FIG. 2, a computer system is illustrated. The methods of the present invention, described above, may be carried out on this system. The system includes two or more computer components 201 and communication channels 202 between them. The method described herein may be carried out by software running one or more computer components 201.

It will be appreciated by those skilled in the art that changes could be made to the embodiments described above without departing from the broad inventive concept thereof. It is understood, therefore, that this invention is not limited to the particular embodiments disclosed, but is intended to cover modifications within the spirit and scope of the present invention as defined in the appended claims. In particular, while the present invention is described herein with reference to the transmission of data among components in an electronic trading platform, it is not limited to this embodiment and is equally applicable to other systems in which data of a certain type may be disproportionately transmitted over select communication channels.

APPENDIX A

```
// (c) 2005 Townsend Analytics, Ltd. All rights reserved.
// This hash function ignores leading and trailing spaces, but processes
interior spaces. unsigned long HashFunction( const char *szRef )
{
  if( 0 == szRef ) return 0;
  unsigned long iResult = 0;
  char *pCur = const_cast<char*>( szRef );
  static unsigned long iSomePrimes[ ] = {
    83, 701, 991, 2081, 16649, 8713, 331, 2803, 1783, 6343,
    683, 1277, 3109, 47, 4799, 3083, 5861, 3331, 8287, 1549,
    113, 1511 };
  static unsigned long iMaxLen =
  sizeof(iSomePrimes)/sizeof(iSomePrimes[0]);
```

APPENDIX A-continued

```
  while( ' ' == *pCur )
    ++pCur;
  for( unsigned long i = 0; *pCur && i < iMaxLen; ++pCur, ++i )
  {
    if( ' ' != *pCur )
      iResult += *pCur * iSomePrimes[i];
    if( i + 1 == iMaxLen ) i = -1;
  }
  return iResult;
}
```

What is claimed is:

1. A method for transmitting data among two or more components of a computer system, the method comprising:
   (A) identifying a count of potential communication channels over which data may be transmitted;
   (B) specifying an identifier associated with the data, the identifier comprising a plurality of symbols;
   (C) applying a hash function to the plurality of symbols to calculate a hash number, wherein a single hash number exists for a given identifier, and wherein the hash function comprises multiplying one or more values encoding one or more of the plurality of symbols by one or more predetermined values; and
   (D) using the hash number and the count of potential communication channels to identify a specific channel over which data associated with the identifier will be transmitted.

2. A computer system comprising:
   a count of potential communication channels connecting two or more computer components over which data is transmitted, wherein the data is associated with an identifier, the identifier comprising a plurality of symbols;
   wherein a hash function is applied to the plurality of symbols to calculate a hash number, wherein a single hash number exists for a given identifier, and wherein the hash function comprises multiplying one or more values encoding one or more of the plurality of symbols by one or more predetermined values; and
   wherein the hash number and the count of potential communication channels are used to identify a specific channel over which data associated with the identifier will be transmitted.

3. A computer-readable medium comprising instructions which, when executed by a processor, perform a method for transmitting data among two or more components of a computer system, the method comprising:
   (A) identifying a count of potential communication channels over which data may be transmitted;
   wherein an identifier associated with the data is specified, the identifier comprising a plurality of symbols;
   (B) applying a hash function to the plurality of symbols to calculate a hash number, wherein a single hash number exists for a given identifier, and wherein the hash function comprises multiplying one or more values encoding one or more of the plurality of symbols by one or more predetermined values; and
   (C) using the hash number and the count of potential communication channels to identify a specific channel over which data associated with the identifier will be transmitted.

* * * * *